(12) United States Patent
Wang et al.

(10) Patent No.: US 8,094,610 B2
(45) Date of Patent: Jan. 10, 2012

(54) DYNAMIC CELLULAR COGNITIVE SYSTEM

(75) Inventors: Ying Wang, Blacksburg, VA (US);
Charles W. Bostian, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 508 days.

(21) Appl. No.: 12/392,419

(22) Filed: Feb. 25, 2009

(65) Prior Publication Data
US 2009/0215457 A1 Aug. 27, 2009

Related U.S. Application Data

(60) Provisional application No. 61/031,064, filed on Feb. 25, 2008.

(51) Int. Cl.
*H04Q 7/00* (2006.01)
*H04W 36/00* (2009.01)
(52) U.S. Cl. ........................ 370/328; 455/444
(58) Field of Classification Search .......... None
See application file for complete search history.

(56) References Cited

U.S. PATENT DOCUMENTS

| | | | |
|---|---|---|---|
| 2005/0007985 A1* | 1/2005 | Park et al. | 370/338 |
| 2006/0271703 A1* | 11/2006 | Kim et al. | 709/239 |
| 2007/0242695 A1* | 10/2007 | Xu | 370/468 |
| 2007/0248066 A1* | 10/2007 | Banerjea et al. | 370/338 |
| 2008/0026775 A1* | 1/2008 | Arazi et al. | 455/462 |
| 2008/0039130 A1* | 2/2008 | Acampora | 455/522 |
| 2008/0080387 A1* | 4/2008 | Wang et al. | 370/252 |
| 2008/0112363 A1* | 5/2008 | Rahman et al. | 370/331 |
| 2008/0153497 A1* | 6/2008 | Kalhan | 455/436 |
| 2008/0293433 A1* | 11/2008 | Wallis | 455/456.1 |
| 2009/0092081 A1* | 4/2009 | Balasubramanian et al. | 370/328 |
| 2009/0196253 A1* | 8/2009 | Semper | 370/331 |
| 2009/0304028 A1* | 12/2009 | Sharif-Ahmadi et al. | 370/474 |

* cited by examiner

*Primary Examiner* — Robert Scheibel
*Assistant Examiner* — Eunsook Choi
(74) *Attorney, Agent, or Firm* — Whitham Curtis Christofferson & Cook, PC

(57) ABSTRACT

High quality communications among a diverse set of cognitive radio (CR) nodes is permitted while minimizing interference to primary and other secondary users by employing Dynamic Spectrum Access (DSA) in a Dynamic Cellular Cognitive System (DCCS). Diverse device types interoperate, cooperate, and communicate with high spectrum efficiency and do not require infrastructure to form the network. The dynamic cellular cognitive system can expand to a wider geographical distribution via linking to existing infrastructure.

20 Claims, 11 Drawing Sheets

| Inter cell Communication | Intra cell Communication | | | | |
|---|---|---|---|---|---|
| Wideband Communication (More Information) | Narrowband Communication (More Information) | | | | |
| Cognitive Radio | Cognitive Radios | Legacy Radios | | | |
| | | Public safety Radio | FRS radio | GSM or CDMA (other types of cellular radio) | WiFi devices |
| WiFi or WiMAX Ad Hoc mode, OFDM | MPSK, QAM, FM, AM, FSK etc | FM, FSK | FM | Predefined modulation types, GMSK etc based. | Predefined modulation types, OFDM based |
| Secondary User Access | Primary User Access | Secondary User Access | Primary User Access | | |
| Channel Allocation Link by Link | | Channel Allocation cell by cell | | | |

*Figure 3*

| | DST-ID | SRC-ID | MSG-TYPE | MSG-STATUS | RX-ID | Ch-Num |
|---|---|---|---|---|---|---|
| REGI (register) | FFFF | CMT# | RQST | REGI | FFFF | ##########(462662600) |
| | CMT# | PCN# | RSPD | REGI | FFFF | ########## |
| | PCN# | CMT# | ACKW | REGI | FFFF | ########## |
| CHAN (request channel) | PCN# | CMT# | RQST | CHAN | CMT# | FFFFFFFFF |
| | CMT# | PCN# | RSPD | CHAN | CMT# | ########## |
| | CMT# | PCN# | RSPP | CHAN | CMT# | ########## |
| | PCN# | CMT# | ACKW | CHAN | CMT# | ########## |
| | PCN# | CMT# | ACKP | CHAN | CMT# | ########## |
| RESU (resume communication) | PCN# | CMT# | RQST | RESU | CMT# | FFFFFFFFF |
| | CMT# | PCN# | RSPD | RESU | CMT# | ########## |
| | PCN# | CMT# | ACKW | RESU | CMT# | ########## |
| TERM (terminate communication) | FFFF | CMT# | RQST | TERM | CMT# | ########## |
| | CMT# | PCN# | RSPD | TERM | CMT# | ########## |
| | PCN# | CMT# | ACKW | TERM | CMT# | ########## |

*Figure 7*

DYNAMIC CELLULAR COGNITIVE SYSTEM

CROSS REFERENCE TO THE RELATED APPLICATIONS

This application claims priority for U.S. provisional application No. 61/031,064 and filed on Feb. 25, 2008 which is herein incorporated by reference.

STATEMENT OF GOVERNMENT INTEREST

This invention was made with Government support under Contract No. CNS-0519959 awarded by the National Science Foundation and Contract No. 2005-I J-CX-K017 awarded by the National Institute of Justice. The Government has certain rights in the invention.

FIELD OF INVENTION

The present invention relates to broadband wireless communications employing cognitive radio and dynamic spectrum access capabilities to solve interoperability, spectrum scarcity, and infrastructure substitution.

BACKGROUND OF INVENTION

Compared to other intelligent communication technologies like the smart antenna, cognitive radio (CR) mitigates the interference by sensing the spectrum and using idle channels. In 2004, when Qualcomm analyzed the feasibility of using CR in cellular wireless communications, it was found that in order to accurately avoid interference the cognitive transmitter is required to measure the effect of its transmission on all possible receivers. However, it is not an easy task for the transmitter to sense the environment of the entire set of possible receivers when the receiver distribution is geographically large. Diversely, even if the transmitter is able to do so, it might be difficult to find the optimal solution for both the transmitter and the receiver without any interference to primary users in such a large area and under such complicated conditions. CR is a self observing, self learning and self decision making radio. When it is performing as the sole secondary user, it is efficient and can reach optimal utilization of the resources. However, when multiple secondary users exist, the competition among the secondary users is a waste of resources.

Traditional communication systems like the Global System for Mobile Communications (GSM) and the Code Division Multiple Access (CDMA) function based on pre-defined channel allocation and sets of protocols. Whereas, CR adapts to channel conditions using the process of sensing an existing wireless channel, evolving a radio's operation to accommodate the perceived wireless channel, and evaluating what happens when a change is made.

SUMMARY OF INVENTION

The invention provides a method and system for providing high quality cognitive communications among CR nodes within the coverage area while reducing or eliminating interference to primary and other secondary users having reasonable computation complexity.

In the present invention, each CR node senses the immediate surrounding environment instead of measuring the effect of its transmission on all possible receivers. Subsequently, multiple secondary users cooperate based on a fair and efficient scheme without losing the flexibility and self adaptation features of CR. The invention defines the network and a set of protocols that each CR node inside the network must adopt to be considered a user within the group. The invention allows users within the group to transmit without interfering with the primary user or secondary users outside the group. Lastly, it makes computational complexity more reasonable for the individual nodes within the group.

BRIEF DESCRIPTION OF THE DRAWINGS

The foregoing and other objects, aspects, and advantages will be better understood from the following detailed description of a preferred embodiment of the invention with reference to the drawings, in which:

FIG. 3 shows a spectrum allocation, modulation types and radio types within the DCCS system.

FIG. 7 is the description of message type for command transmission. These messages provide the information needed for the PCN to manage its cell.

DETAILED DESCRIPTION

Cognitive Radio (CR) technology is well understood in the art. U.S. Pat. No. 7,289,972 to Reiser, which is herein incorporated by reference, describes CR technology and algorithm's used to adapt a wireless radio to a changing environment. Self organizing networks are also known in the art. U.S. Pat. No. 7,171,476 to Maeda, which is herein incorporated by reference, describes an example of self-organization of a number of nodes. The use of CR based wireless communications in dynamic access networks is also understood in the art. U.S. Patent Publication 2008/0089306 to Hu, which is herein incorporated by reference describes an exemplary method of addressing inter-systems (cells) communications for coexistence and spectrum sharing. The invention builds on these and other technologies.

Figure 1:
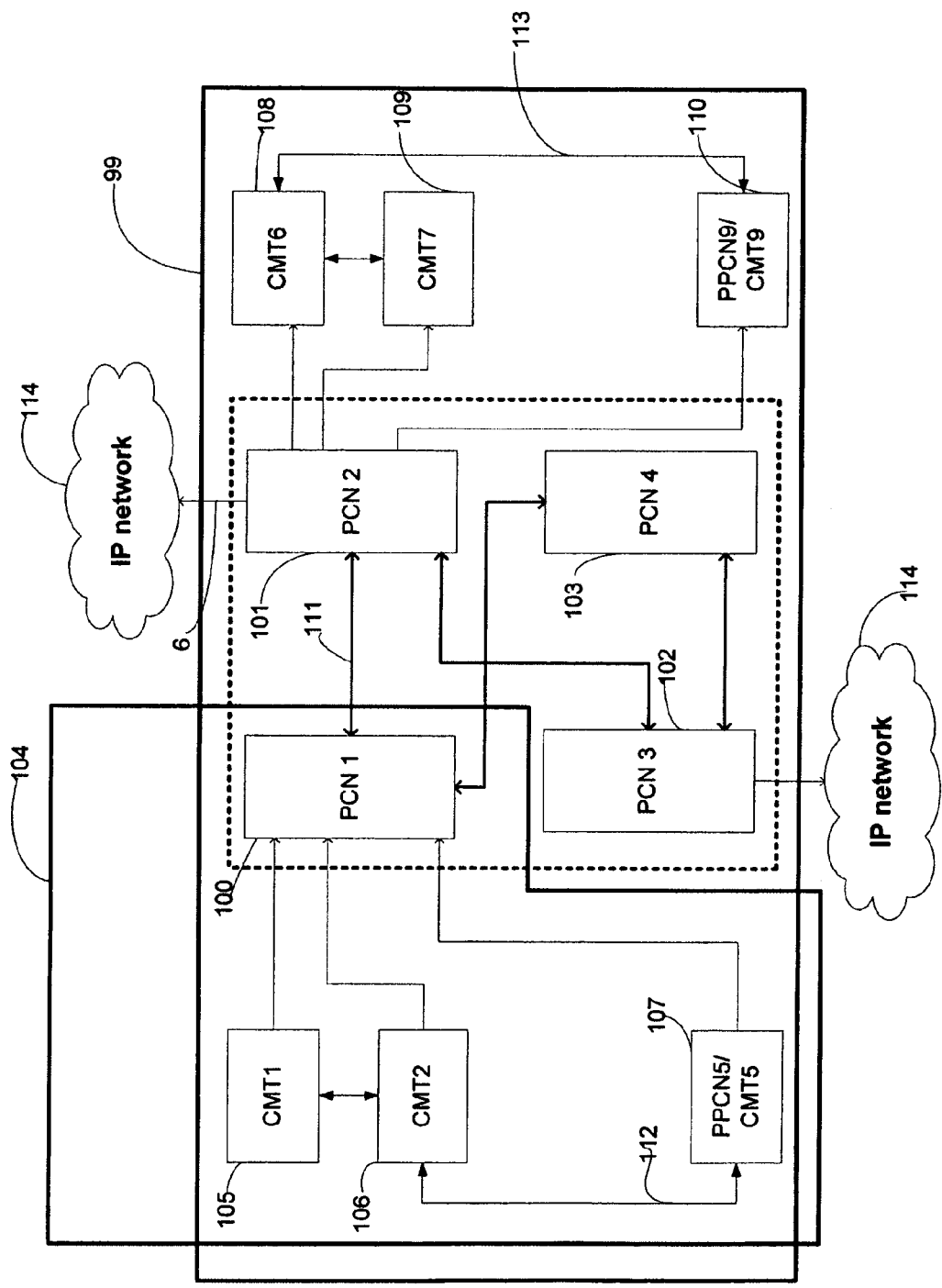
FIG. 1 is a block diagram of an implementation of the DCCS to replace the destroyed part of the IP network and reconnect it to infrastructure.

FIG. 1 shows an example of the implementation of a cognitive radio network according to the invention. When the infrastructure of an IP network is not available, cognitive radios (CR) collaborating in an efficient, effective manner can serve as an ad-hoc communication network bridge, defined herein as Dynamic Cellular Cognitive System (DCCS). The DCCS creates such a framework as shown in FIG. 1 and comprises multiple individual cognitive radios that serve as individual nodes with the capability to establish mini-networks within the large network 99. Many of the CR nodes register themselves as mini-base stations, or Picocell Cognitive Nodes (PCNs) 100-103. The concept of picocell appears in some traditional communication networks. A picocell is analogous to a WiFi access point in a WiFi network, a picocell basestation in a GSM networks, or a femtocell in UMTS, CDMA2000, TD-SCDMA and WiMAX solutions. Compare to a picocell in traditional network, a PCN is a cognitive radio node, and it servers not only base station, but also intra-cell management and Dynamic Spectrum Access function. It also has the ability of switching between base station and mobile terminal. The coverage of a PCN is called a cell 104. The cell is defined as the distribution area of all the nodes which register with a PCN. The size of a cell is dependent on the PCN's transmission power and current battery storage, as well as the CMTs' or other registered radios' distributions. The PCN has the ability to identify the received signal, synchronize the signal, and demodulate the signal automatically. This ability provides accommodation to more different types of radios and adaptability to channel varying because a PCN is always able to understand the radios registered with. PCN provides the spectrum management within its cell.

All the cognitive mobile terminals (CMT) 105-110 in the cell can be secondary users. However, by coordinating with a PCN, CMTs can all access the spectrum without causing interference with primary users in an efficient way. PCNs serve as a digital gateway providing interoperability among different types of radios including, but not limited to FRS radio, public safety radio, cell phone, broadband devices, all of which normally cannot cooperate with each other.

PCNs use a power control optimization algorithm to control the power of each node within its cell to realize frequency reuse among different cells. The connections between PCNs, defined herein as inter-cell communication, 111 utilize wideband signal transmission schemes, such as WiFi or WiMAX, and function as a wireless backbone. The situation aware dynamic routing protocol is used for backbone connections to forward data to the desired destination. Frequency distribution and power control are the two primary enabling technologies. Because of the cellular structure based network, the increased capacity comes from the fact that the same radio frequency can be reused in a different cell for a completely different transmission. This technology is the same as what is used in a traditional cellular network. PCNs use power control to adjust the distance of its transmitted signal propagation distance and therefore guarantee the quality of cells frequency reuse. Frequency reuse only applies to data transmission, not the command message transmission. A command message is for exchanging information between a PCN and a CMT or among PCNs to coordinate on spectrum utilization, routing topology and cell management. Thus, when a CMT or a PCN first joins the network, it can send out request message to set up the connection with a PCN without knowing the prior cell frequency allocation information. DCCS's topology adapts based on an algorithm that allows adjacent cells to join into one. This functionality depends on the area of the cells, the number of users in the cells, and the geographic conditions of the cells.

In addition to inter-cell communication, DCCS manages communication between PCNs and CMTs within a given cell, defined herein as intra-cell communication link. Protocols about intra-cell communication defined how three way handshaking among a PCN and CMTs can allow CMTs to access spectrum as secondary users without causing interference with primary user and other users outside of DCCS system. A PCN allocate channels to either communication between two CMTs within the cell or communication between a CMT in the cell and a CMT outside of the cell via PCN itself as a forwarding point. It also serves as gateway for two radios that do not have compatibility directly. For example, there exists a secondary user access link on the spectrum allocated by a PCN between CMTs 112 and 113. The more detailed descriptions are in FIG. 3 to FIG. 5. Finally, there is the connection to the existing infrastructure 114; it is the bridge for DCCS to connect to the IP network that is not damaged or destroyed (see FIG. 9 for example).

Figure 2:
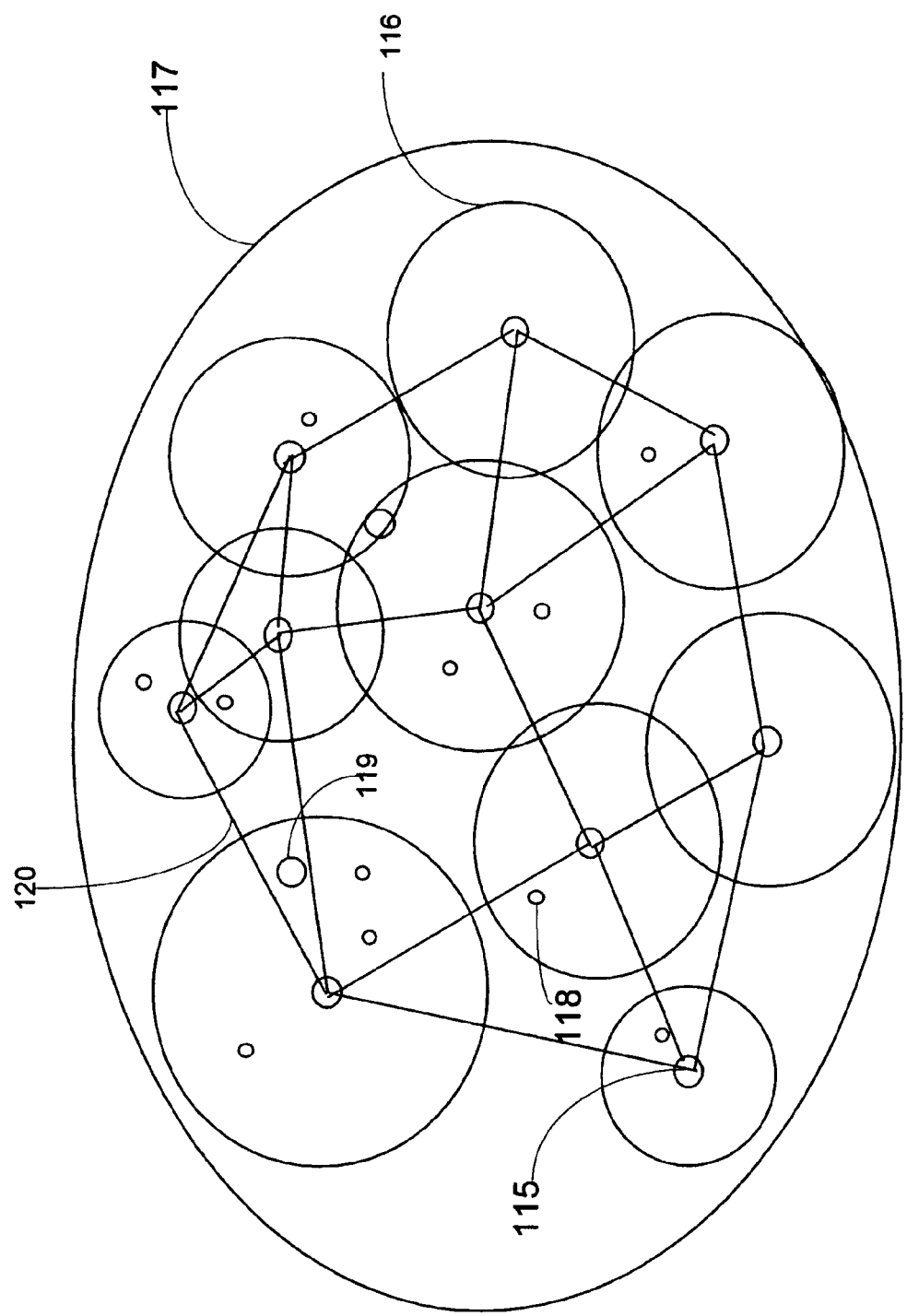
FIG. 2 is a concept level DCCS system design. It defines the role of PCN, PPCN, CMT, cell forming, and inter-cell communications

FIG. 2 is a concept level DCCS system design. It defines the role of a Potential Picocell Cognitive Node (PPCN) functioning as a PCN 115 which serves as the base station for its individual cell 116. The coverage area of the cells define which other components of the DCCS local network 117 exist within said cell, such as: CMTs which do not have the ability to serve as a PCN 118, a PPCN in a CMT status 119, and the backbone connection between PCNs 120. All PCNs are transformed from PPCNs. A CMT node can either be transformed from a PPCN or it can only serves as CMT because of the hardware of other restrictions. A PPCN node can transform to two statuses, PCN and CMT. When a PCN comes to an area, it will first send out registering message to request registering with an existed PCN as a CMT. If there is an existed PCN responds to the request and sends back a respond message, then this PPCN sends back acknowledge message to confirm the registration and become to be a CMT. This process is a handshaking process. All command message transmission in this invention use three way handshaking principle. If no existing PCN responds to the registration request message, then, this PPCN will transform to a PCN status, connect to other PCNs and perform a PCN's role. The cells of two PCNs are allowed to have overlap. A soft handoff same as it is in GSM network is performed.

DCCS system is a system that mixes the cognitive radios and non-cognitive radios, primary user and secondary users. It is necessary to have some regulations about the modulation of transmission and spectrum accessing. FIG. 3 is a chart describing the allocation strategy and modulation types for inter-cell communications and intra-cell communications. Each radio presenting in the DCCS coverage area can be assigned a channel when it requested. By interchanging the message and scanning of each sub channel, a PCN will obtain the statistic channel records including the accumulated duration of channel being occupied by primary or other secondary user outside of DCCS system, accumulated duration of channel being vacant, latest moment a channel being vacant, latest moment a channel being occupied by primary or other secondary user outside of DCCS system. We assume that the event of primary users or other secondary users outside of DCCS system present in the channel is an exponential distribution. Using these channel records, a PCN can predict the next moment channel conditions so that it can make the optimal decision when allocating a channel. The channel that has the least probability of being interrupted by the primary channel during the communication will be assigned.

Intra-cell communications between CMTs work cognitively, which means that the CMTs calculate the optimal resource utilization and modulation scheme, while satisfying the restriction of the distributed spectrum in the cell. Intra-cell communication includes the communication between two CMTs within the cell, and between a CMT and the PCN in the cell. The communication could be multiple narrow band modulations including MPSK, FM, AM, FSK, or it could be OFDM based wideband communication. Each CMT chooses the mode that best fits the current environment and individual transmission requirements. The inter-cell communications between CMTs in different cells are coordinated through PCNs. PCN's execute inter-cell communication using wideband transmission schemes such as WiFi or WiMAX. WiFi and WiMAX or other broadband communications are preferred because the sums of inter-cell communication payloads are relatively large. Among them, WiMAX is preferred because it covers longer distance with a scheduled MAC layer principle. Also, a PCN as a powerful CR node has the ability to classify signals and perform synchronization, thus, it can accommodate multiple modulation types.

Figure 4:
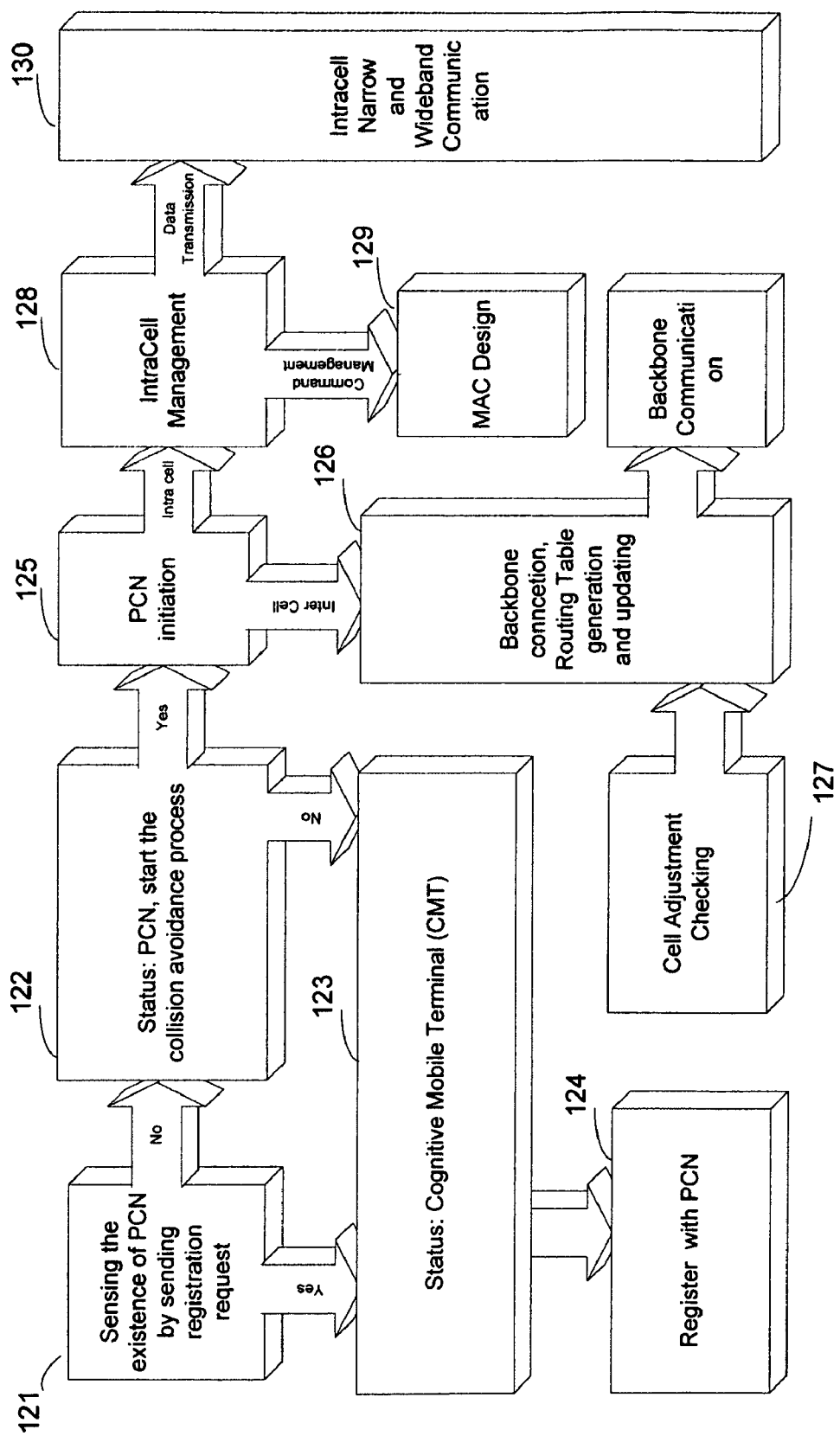
FIG. 4 is a high level block diagram of an implementation of a PPCN cognitive radio node.

FIG. 4 is the block diagram for designing a PPCN implemented using software-defined-radio-based architecture. A series of CR nodes functioning as PPCNs begin to sense the surrounding area by sending out a registering request 121. If the received signal power of respond message from a PCN is lower than a predetermined threshold or no response message is received, it will assume there is no PCN available, and begin collision processing in case multiple PPCNs try to switch to PCN status at the same time in the same cell 122. For collision process, a PPCN will first listen to a random short period of time on the lowest available channel. During this time, if it received collision message from others, it will stay as a CMT 123 and register with the PCN 124 which sends out the collision message. If not, it will send out collision message and transform to a PCN. Lowest available channel is a way to dynamically collect all collision messages in the same channel. It can be other definitions, such as highest available channel. For a PPCN stays in the CMT status, if it keeps on receiving request message from another CMTs, it will switched back to a PCN. Additionally for the CMT, if the PCN which it is registering with is not available because of some unpredictable event, it will switch to a PCN. The collision processing in this scenario includes avoiding competition among several possible CMTs in the cell. When the PCN in one cell stops working, a CSMA like protocol is used. Every node will back up for a small amount of time t, the detected energy from the former PCN is e, the relationship between t and e is defined as: et=c, where c is a constant. In this way, we can make sure that the PPCN that is closest to the former PCN becomes the new PCN, and most of the CMTs in the previous cell do not have to change to another cell. Once a PCN is initialized within hardware and software 125, it connects with all other PCNs in the DCCS local network and begins updating and broadcasting its routing table 126. Cell size adjustment and cell frequency allocation depend on the number of CMTs within the cell and can change based on CMT mobility 127. These attributes are key components of this inter-cell management.

For PCN intra-cell management 128, it is PCN's responsibility to coordinate the transmission within its cell, allocate channel, and servers as gateway for radios that are not compatible. Spectrum information is gathering via energy detection from multiple nodes. Both the PCN and CMTs sense the spectrum and share available spectrum information using specifically designed scheme. A CMT randomly chooses a channel, and uses energy detection to determine the existence of signal in the channel. Based on CSMA, if no signal is present in the channel, it can send out command message. PCN listens to all channels sequentially. It processes and responds to the message it receives and collects the channel information meanwhile. Based on the channel information it collects, it calculates for the optimal decision to allocate channel. To avoid adjacent-cell interference, spectrum allocation is also negotiated among adjacent cells by the PCNs through inter-cell protocols. The CMTs are then informed of the results by the PCNs so that the CMTs do not experience intra-cell interference and adjacent-cell interference. Additional functionality for intra-cell management includes a MAC protocol 129 and gateway and data forwarding to CMTs within the cell 130.

Figure 5:
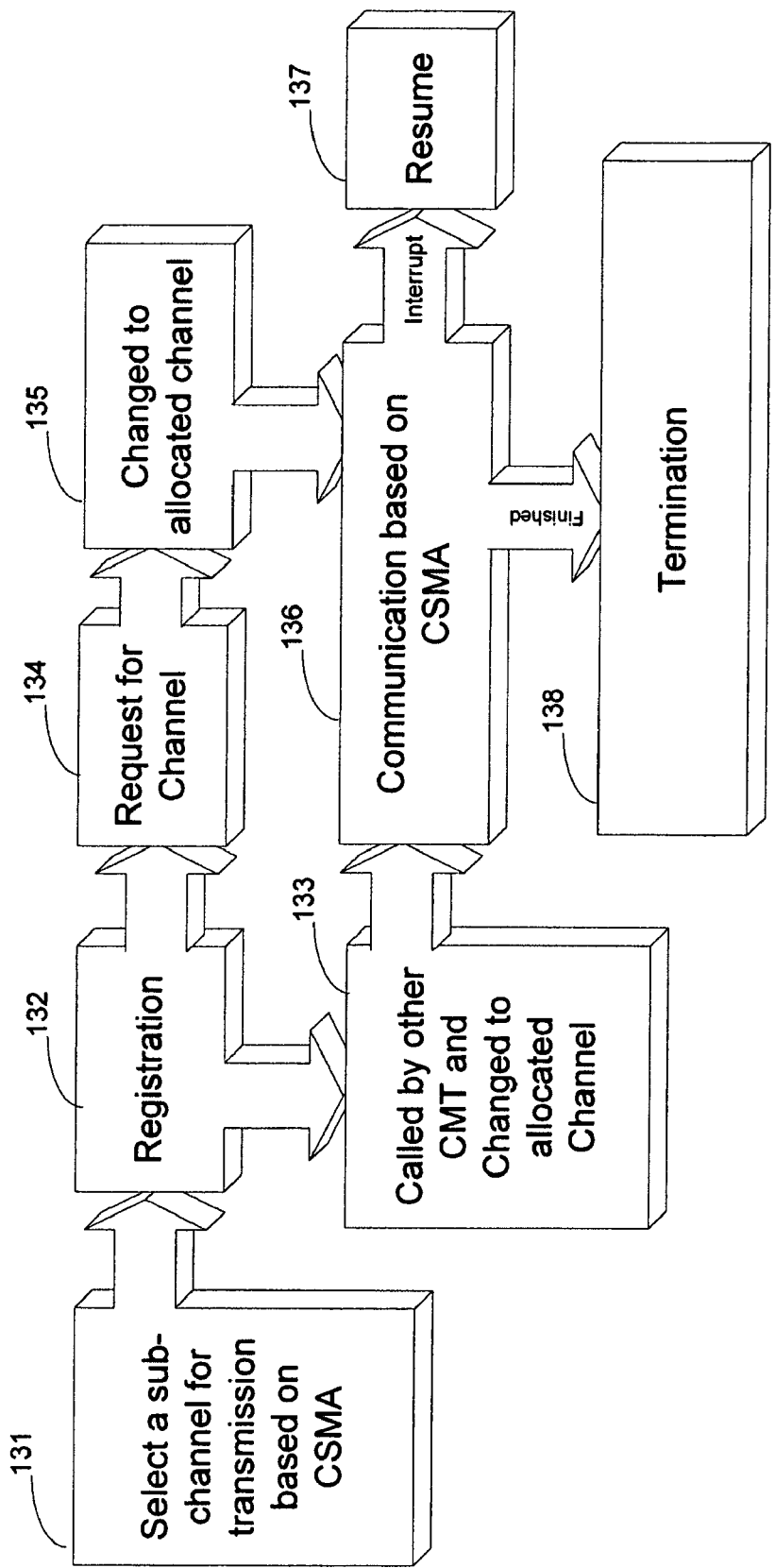
FIG. 5 is a high level block diagram of an implementation of a CMT cognitive radio node.

FIG. 5 is the block diagram for a CMT. It is necessary for a CMT to follow the protocol described in FIG. 3 because it is required when the PPCN switches to CMT status. A CMT can also be an individual node which does not satisfy the hardware requirement of a PPCN and can only serve as a CMT. A legacy radio cannot serve as CMT because it is not a cognitive radio, and it cannot reconfigure to adopt the protocols. Many legacy radios can be connected to DCCS system because of the gateway function of a PCN. Based on carrier sensed multiple access (CSMA), a CMT assigns itself a sub-channel 131 in order to register itself within the cell in accordance with MAC protocols 132. Once the CMT is registered on a cell, it can be allocated a channel in one of two ways: (i) the CMT is requested by another CMT and is allocated a channel in order to communicate 133, or (ii) submit a request for a channel assignment from the PCN 134. Once the PCN allocates a channel following the CMT's request, the CMT changes to the allocated channel 135. A CMT will continue to communicate on the allocated channel 136 until it is interrupted by a number of possible events including but not limited to: (i) a primary user requests the channel, or (ii) another CMT makes a request, or (iii) the CMT travels outside the cell coverage area. When interrupted, the CMT can request to resume communication 137 or inform the PCN it is ready to terminate the connection 138 when finished with its communication.

Figure 5A:
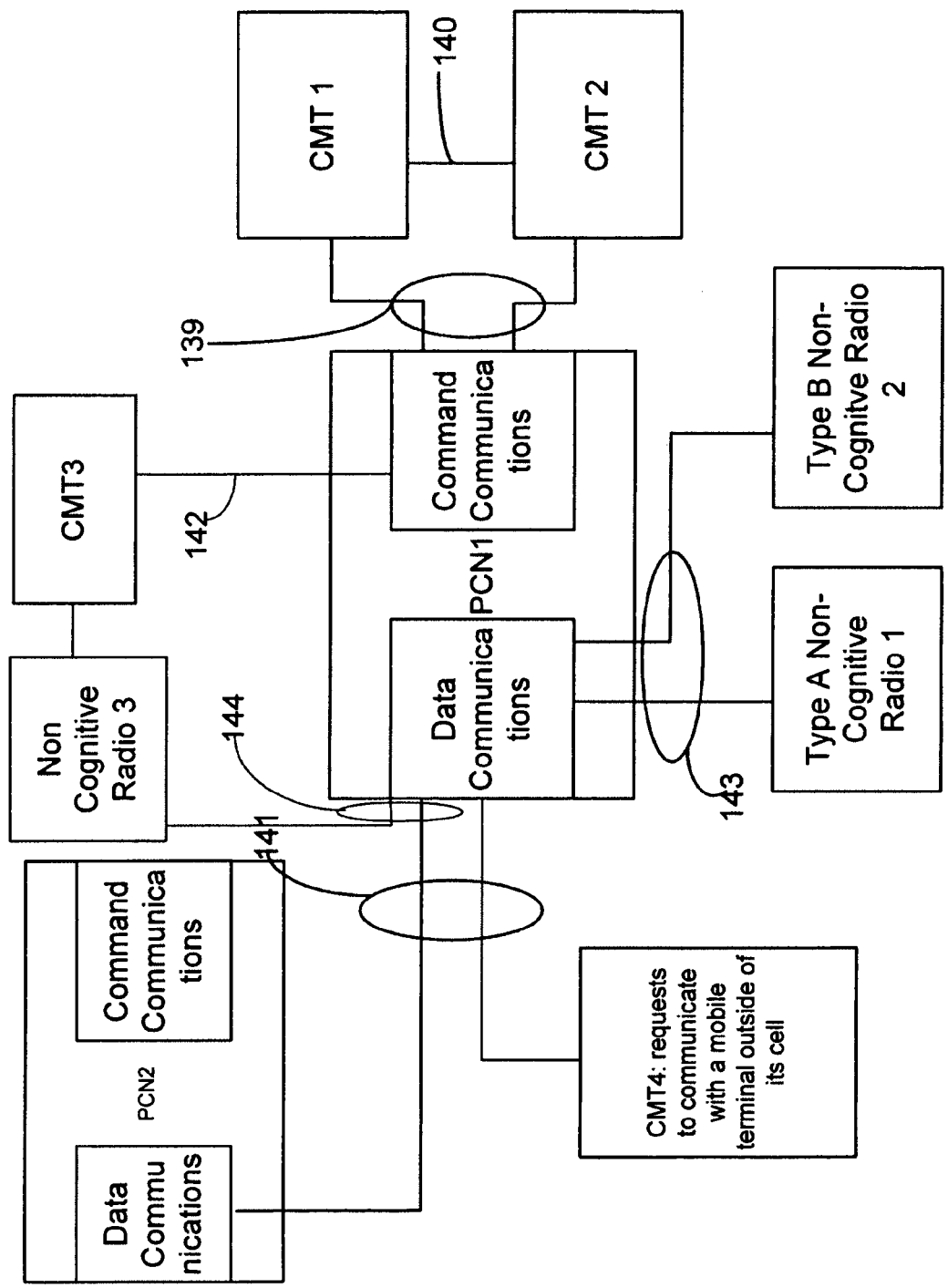
FIG. 5A is a block diagram showing the detailed communication types for intra-cell communications.

With reference to FIG. 5A, DCCS can accommodate both CMT and legacy radios, and based on the radio type and location, the PCN can take one of several actions such as allocate the optimal channel 139 and 140, allocate the optimal channel and forward the transmission to another cell 141, request that the CMT reconfigure 142, serve as a gateway 143, or serve as a gateway with forwarding 144.

Figure 6:
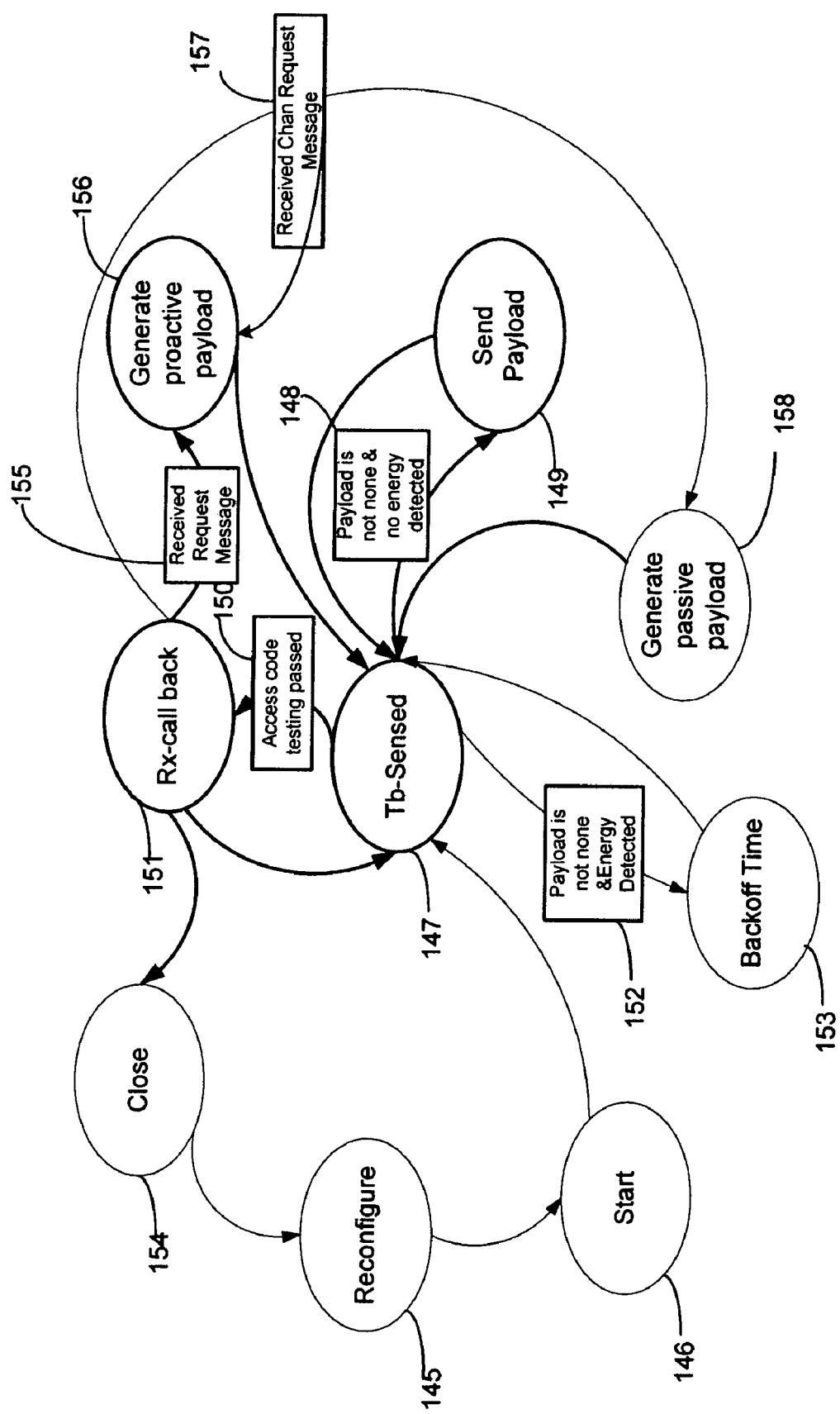
FIG. 6 is a MAC layer design in a finite state machine form. This design provides for how the secondary user group avoids interference with primary users or other secondary users.

FIG. 6 is concept level MAC layer design for intra-cell communication. The radio reconfigures to a frequency in order to scan a new channel 145, and then the flow graph of the GNU radio is configured 146. Based on CSMA requirements, the radio always listens before it talks, thus the $T_b$-sensed function 147 is used to sense the sub-channel. The sensing process is also a receive process of which there are three possible sequences. If the channel is available and has something to send 148, it will send the payload 149. If the channel is not available but receives a message during the sensing, it detects the access code 150, demodulates the message, and determines the next step 152. If it does detect energy but there is no message that can be demodulated 152, this means either primary user is back to the channel or other secondary users outside of DCCS system is occupying the channel. It will back off a short time and prepare to sense the channel again 153. From the second case, depending on the content of received message, the PCN will determine the next step. For example, if the command confirms that a command has been completed, the PCN will close the cycle in this sub-channel 154 and reconfigure to the next sub-channel. If the command is a request message but not a channel request message 155, it will generate a new payload based on the request 156 and go to the block status. If the message is a channel request message, it will generate proactive payload messages 157 for the requesting CMT and passive payload messages 158 for the requested CMT.

FIG. 7 is a chart about the message format for command communication between CMTs and PCNs. There are 4 types of messages and 3 stages for each of them except for channel request message, there are 5 stages. The 4 types of messages include registering message, channel request message, communication resume message, and communication termination message. 3 stages represent for 3 way handshaking processing, including request, respond and acknowledgement. For channel request message, because the PCN needs to respond to both the proactive and passive radios the allocated channel information, and both of them need to acknowledge the receiving of the respond message, there are 5 stages.

Figure 8:
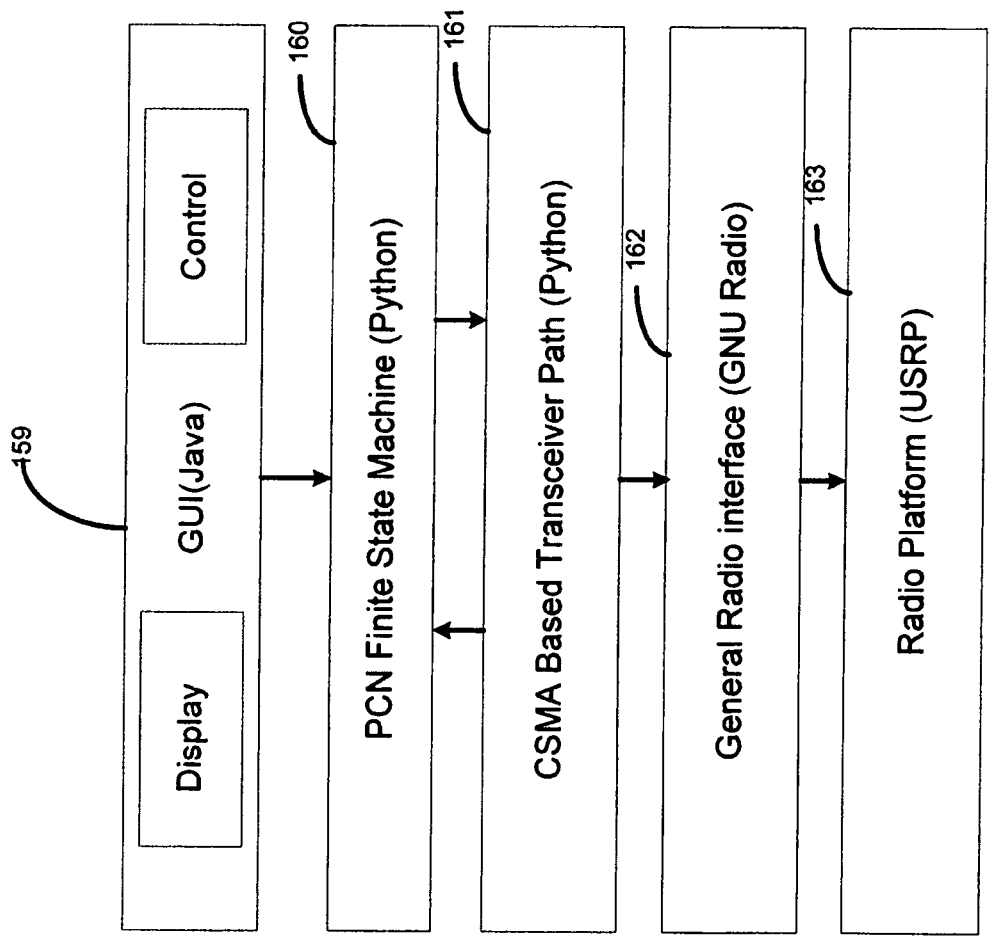
FIG. 8 is an architecture design and implementation for a PCN including a software part and a hardware part.
Figure 8A:
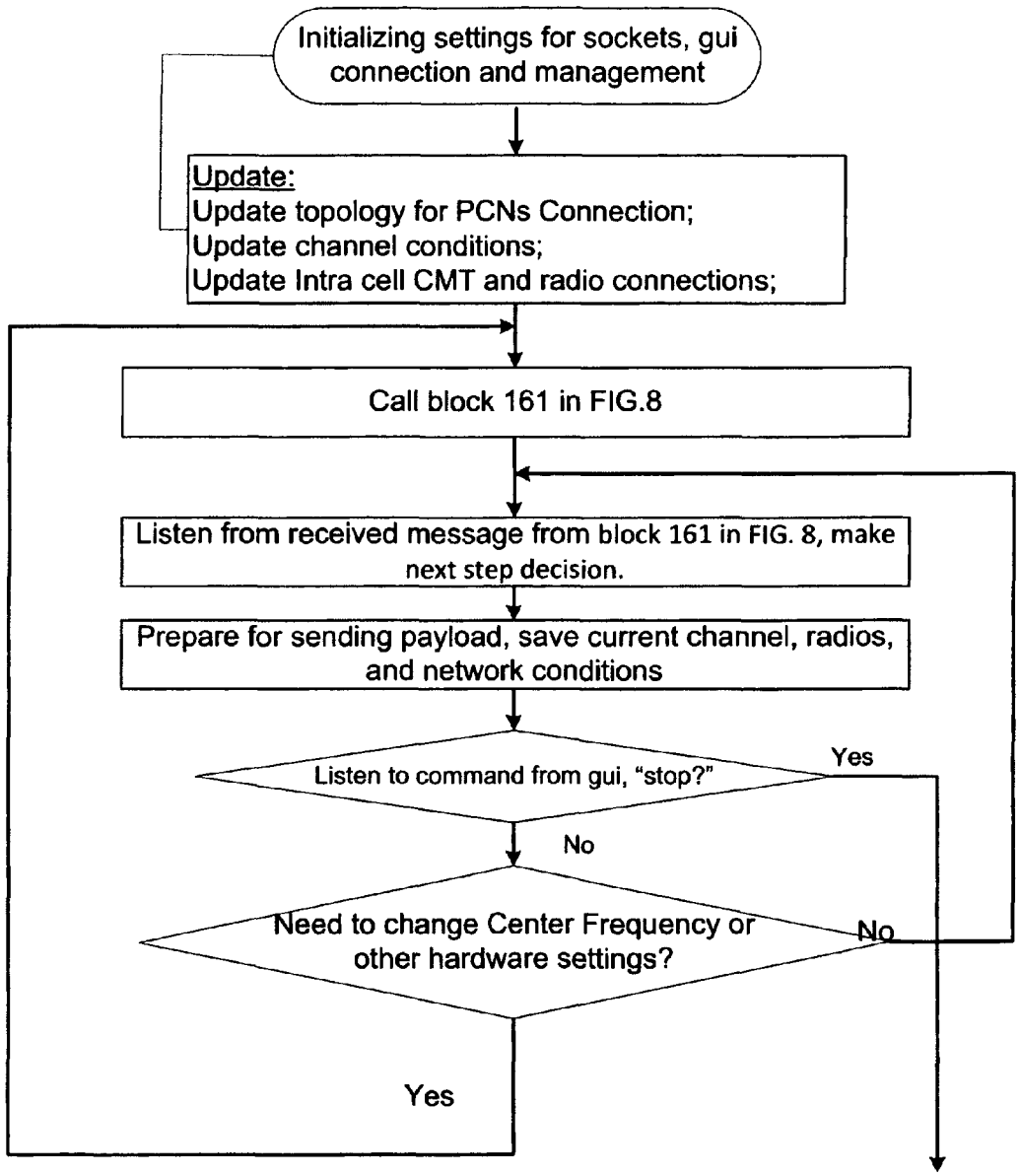
FIG. 8A is a flowchart showing the block 2 in FIG. 8.

FIG. 8 shows the hardware and software interfacing to perform the necessary control functions for DCCS. The system includes a graphical user interface (GUI) that has both display and control capabilities 159. PCNs are controlled 160 and 161 as described in FIG. 8A in software. GNU Radio 161 serves as the platform to manage both of these software tools as well as reconfigure the cognitive radio platform 162 when necessary.

Figure 9:
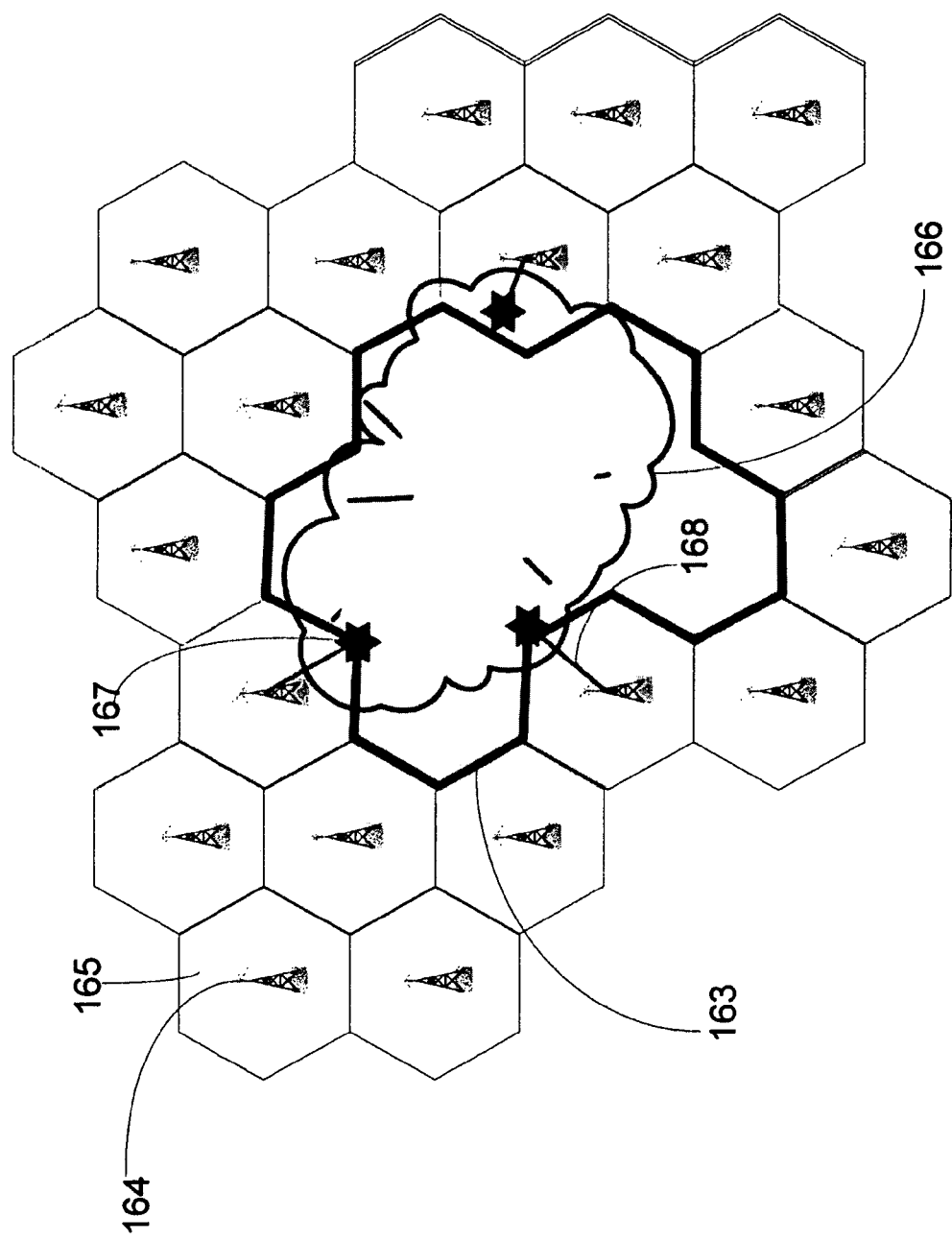
FIG. 9 describes bridging DCCS network to infrastructure.

FIG. 9 shows how the DCCS system bridges to an IP network infrastructure in the instance where the IP network infrastructure is not available 163. A base station 164 and the cell area 165 represent the individual cells in the existing IP network infrastructure. In order to bridge the DCCS coverage area 166 to the IP network infrastructure, the cognitive node within the DCCS coverage area closest to a base station in the existing IP network infrastructure 167 creates a connection 168 that is compatible with the existing IP network. In the event the cognitive node connecting to the IP network is a CMT, the CMT will switch its mode to a PCN in order to enable the connection. The elements of the DCCS network that connect to the existing IP infrastructure act as the bridge enabling the entire DCCS network to be connected to infrastructure. An example DCCS application in this scenario would be the implementation of DCCS in the 700 MHz TV white space. The Federal Communications Commission's (FCC) decision about implementing a nationwide, broadband, interoperable public safety network in legacy wideband (WB) 767 MHz-773 MHz and 797 MHz-803 MHz can provide the bandwidth DCCS needs for the intra cell communication and the backbone connection. DCCS provides the real time set up, reliable communication system which can accommodate multiple communication devices. According to FCC, the three principles for ensuring effective public safety use of the 700 MHz band are nationwide access, competitive equipment market, and flexibility to meet the needs of regional communities. Implementation of DCCS in 700 MHz with bridging to broadband communication would present an opportunity to put into place a framework that would ensure the availability of effective spectrum usage in the 700 MHz band for interoperable, public safety radios.

While the invention has been described in terms of one or more preferred embodiments, those skilled in the art will recognize that the invention can be practiced with modification within the spirit and scope of the appended claims.

The invention claimed is:

1. A dynamic cellular-based cognitive system, comprising: a plurality of cognitive radios each of which is configured to function as a picocell cognitive node (PCN) or a cognitive mobile terminal (CMT) depending on whether said cognitive radio senses the existence of a PCN, where a cognitive radio either establishes itself as a PCN if no PCN is sensed upon sending a registration request or registers itself as a CMT with a particular PCN upon receiving a response to a registration request;
at least a first group of cognitive radios function as PCNs and at least a second group of cognitive radios function as CMTs,
each PCN within said first group provides spectrum management within its respective cell, and each PCN within said first group managing inter-cell communications between one or more PCNs within said first group, and
each CMT with said second group function cognitively, and are configured for both direct intra-cell communications with another CMT or indirect intra-cell communications using the PCN to which it is registered.

2. The dynamic cellular-based cognitive system of claim 1 further comprising one or more radios, and wherein each PCN assigns communication channels among one or more narrow band modulations selected from the group consisting of MPSK, FM, AM, and FSK or OFDM wideband communication for intra-cell communications with one or more CMTs or one or more radios within its cell.

3. The dynamic cellular-based cognitive system of claim 2 wherein said one or more radios include legacy radios.

4. The dynamic cellular-based cognitive system of claim 1 wherein each PCN manages spectrum access within its cell dynamically according to a channel selection strategy.

5. The dynamic cellular-based cognitive system of claim 1 wherein each PCN manages spectrum access within its cell dynamically in combination with one or more adjacent PCNs.

6. The dynamic cellular-based cognitive system of claim 1 wherein each CMT or other node saves information pertaining to a detected energy from its PCN for a specified amount of time, and, if a PCN for a cell stops functioning, the information is used to identify an alternative PCN for said cell which is the closest to said PCN which stops functioning.

7. The dynamic cellular-based cognitive system of claim 1 wherein one or more of PCNs and CMTs use energy detection to determine existence of a signal on a channel.

8. The dynamic cellular-based cognitive system of claim 7, wherein each PCN analyzes channel records for nodes in its cell on the duration of occupation each channel basis by primary and secondary users.

9. The dynamic cellular-based cognitive system of claim 7, where in each PCN detects energy on each channel sequentially and sends and receives command messages to manage channels.

10. The dynamic cellular-based cognitive system of claim 7 wherein a detection result will be used by a PCN for channel statistic information analysis to predict an optimal channel to allocate when said PCN is being requested for a channel assuming primary users or other secondary users outside of a group is an exponential distribution.

11. The dynamic cellular-based cognitive system of claim 1, wherein each PCN and CMT control collision avoidance by permitting transmissions on channels where energy is not detected.

12. The dynamic cellular-based cognitive system of claim 11, wherein each of a plurality of potential PCNs (PPCN) that is transformed to a PCN will listen a short duration for a collision message and sending out a transmission if no collision message is received from others using a same channel which is the available channel with lowest frequency and which is dynamically decided during the transmission.

13. The dynamic cellular-based cognitive system of claim 11, where each PCN waits for acknowledge message after sending respond message when a request message on said channel is detected.

14. The dynamic cellular-based cognitive system of claim 11, where each PCN switches to a next channel when an acknowledge message on a channel is detected, or when a waiting time for said acknowledge message exceeds certain threshold.

15. The dynamic cellular-based cognitive system of claim 11, where PCN eliminates from use a channel where energy is detected but no request or acknowledge message is detected.

16. The dynamic cellular-based cognitive system of claim 11, where CMT sends request message based on demand when no energy is detected on a channel.

17. The dynamic cellular-based cognitive system of claim 11, where CMT randomly choose another channel for energy detection if energy is detected on said channel and no respond message is detected.

18. The dynamic cellular-based cognitive system of claim 11, wherein a cognitive radio establishes itself as a CMT switched to PCN if a repeat receiving request message is received from another CMT for a specified time duration.

19. A bridge connecting a break in an Internet Protocol network, comprising a dynamic cellular-based cognitive system comprising:
   a plurality of cognitive radios each of which is configured to function as a picocell cognitive node (PCN) or a cognitive mobile terminal (CMT) depending on whether said cognitive radio senses the existence of a PCN,
   where a cognitive radio either establishes itself as a PCN if no PCN is sensed upon sending a registration request or registers itself as a CMT with a particular PCN upon receiving a response to a registration request;
   at least a first group of cognitive radios function as PCNs and at least a second group of cognitive radios function as CMTs,
      each PCN within said first group provides spectrum management within its respective cell, and each PCN within said first group managing inter-cell communications between one or more PCNs within said first group, and where at least one PCN of said first group is in communication with said Internet Protocol network, and
      each CMT with said second group function cognitively, and are configured for both direct intra-cell communications with another CMT or indirect intra-cell communications using the PCN to which it is registered.

20. The bridge of claim 19 wherein a CMT of said second group becomes a PCN of said first group when said CMT is able to communicate with said Internet Protocol network directly.

* * * * *